(12) United States Patent
Stapleton

(10) Patent No.: US 8,031,058 B2
(45) Date of Patent: Oct. 4, 2011

(54) SOUND-EMITTING DEVICE

(76) Inventor: Howard Stapleton, Merthyr Tydfil (GB)

( * ) Notice: Subject to any disclaimer, the term of this patent is extended or adjusted under 35 U.S.C. 154(b) by 0 days.

(21) Appl. No.: 11/465,299

(22) Filed: Aug. 17, 2006

(65) Prior Publication Data

US 2007/0037691 A1 Feb. 15, 2007

Related U.S. Application Data

(63) Continuation-in-part of application No. PCT/GB2006/002843, filed on Jul. 31, 2006.

(30) Foreign Application Priority Data

Aug. 23, 2005 (GB) ................................ 0517226.7
Feb. 6, 2006 (GB) ................................ 0602284.2

(51) Int. Cl.
*G08B 3/00* (2006.01)
(52) U.S. Cl. ................................ 340/384.1; 340/384.7
(58) Field of Classification Search ............... 340/384.1, 340/384.7
See application file for complete search history.

(56) References Cited

U.S. PATENT DOCUMENTS

| | | | | |
|---|---|---|---|---|
| 3,745,552 A | * | 7/1973 | Wilt | 340/527 |
| 3,886,492 A | * | 5/1975 | White | 367/139 |
| 4,065,767 A | * | 12/1977 | Neuhof et al. | 340/384.4 |
| 4,999,818 A | * | 3/1991 | Malleolo | 367/139 |
| 5,602,523 A | * | 2/1997 | Turchioe et al. | 340/384.2 |
| 6,017,302 A | * | 1/2000 | Loos | 600/28 |
| 6,392,549 B1 | * | 5/2002 | Wu | 340/573.2 |
| 6,559,758 B2 | * | 5/2003 | Rey | 340/384.6 |
| 6,771,177 B2 | * | 8/2004 | Alderman | 340/585 |
| 6,933,837 B2 | * | 8/2005 | Gunderson et al. | 340/436 |
| 7,263,033 B2 | * | 8/2007 | Borsina et al. | 367/139 |
| 2004/0201459 A1 | * | 10/2004 | Rich et al. | 340/384.2 |

FOREIGN PATENT DOCUMENTS

| | | |
|---|---|---|
| CA | 2091043 | 9/1994 |
| WO | WO/93/07600 | 4/1993 |

OTHER PUBLICATIONS

"Tillicum Journal; This Music is Intended to Make Youths Walk" by Timothy Egan (Aug. 22, 1990), http://query.nytimes.com/gst/fullpage.html?res=9C0CE6DB153EF931A1575BC0A966958260.*

Sonic Weapons (http://www.forteantimes.com/features/articles/256/sonic_weapons.html), Jack Sargeant, Dec. 2001.*

Frequency Range of Human Hearing (http://hypertextbook.com/facts/2003/ChrisDAmbrose.shtml), Glenn Elert, Jul. 29, 2003 (via Internet Archive).*

(Continued)

*Primary Examiner* — Travis R Hunnings
(74) *Attorney, Agent, or Firm* — Gordon & Jacobson, PC

(57) ABSTRACT

A sound-emitting device (10, FIG. 1) may be mounted to a wall near places which will be unsuitable for the congregation of young person, such as outside shops and on street corners. The device generates sound waves at a frequency that is detectable by one or more subgroups of individuals within a group of individuals.

35 Claims, 1 Drawing Sheet

OTHER PUBLICATIONS

Search Report in related application GB 0602284.2, now GB 2,421,655, Search Report dated May 17, 2006.

TeenRepel, "So How Does It Work", listed in Search Report above, exact date unknown, apparently obtained by GB Patent Office at www.teenrepel.co.uk.

BBC, "Dispersing A Crowd", Aug. 2, 2004, listed in Search Report above, apparently obtained by GB Patent Office at www.bbc.co.uk.

Search Report in related application GB 0602284.2, now GB 2,421,655, Search Report dated May 17, 2006.

TeenRepel, "So How Does It Work", listed in Search Report above, exact date unknown, apparently obtained by GB Patent Office at www.teenrepel.co.uk, copy attached May 2006.

BBC, "Dispersing a Crowd", Aug. 2, 2004, listed in Search Report above, apparently obtained by GB Patent Office at www.bbc.co.uk.

* cited by examiner

SOUND-EMITTING DEVICE

CROSS-REFERENCE TO RELATED APPLICATIONS

This application for United States patent is a continuation-in-part of co-pending International Patent Application No. PCT/GB2006/002843, with an international filing date of Jul. 31, 2006, which designated, inter alia, the United States, and which claims priority benefit of co-pending United Kingdom Patent Applications Nos. 0517226.7 filed Aug. 23, 2005 and 0602284.2 filed Feb. 6, 2006, incorporated by reference herein as if set fourth in their entireties herein.

FIELD OF THE INVENTION

The present invention relates generally to devices for emitting sounds, and more particularly, the generation of sound waves that are preferentially prominent to the hearing of young individuals, and particularly but not exclusively to the generation of sound waves which are preferentially prominent to the hearing of young individuals in order to disperse large gatherings of young individuals in a given location.

BACKGROUND OF THE INVENTION

Sounds are characterised by their frequency and vary from the infrasonic vibrations (typically <20 Hz) of earthquakes and volcanoes to the ultrasonic (typically >100 kHz) calls of dolphins and bats.

Experiments have shown that a healthy young person hears all sound frequencies from approximately 20 Hz to 20 kHz. However, a person's lifestyle and age can reduce the sensitivity of the persons hearing, effectively reducing the audible frequency range. Elderly persons for example, typically cannot hear the upper range of frequencies. Accordingly, it is possible to target generally younger persons with sound waves which have a frequency in the upper quarter of the audible range, i.e. above 15 kHz, since the majority of older persons will be incapable of detecting the sound.

The present invention is concerned with the generation of sound waves that can be heard by a subset of a species of individuals. In particular, the invention deals with the generation of sound waves which can lead to the dispersing of individuals and in particular groups of young persons in places where their congregation is unsuitable, such as outside shops and street corners. It is common for large numbers of young persons to gather at certain locations, which can jeopardise their own safety and which can often cause a hindrance to other members of the public. In addition, groups of rowdy young people can sometimes intimidate other passers-by.

However, conventional methods of dispersing crowds of young people can often be disruptive to other members of the public and can be confrontational, particularly if the police are required.

It would therefore be desirable to provide improved methods, devices and systems for dispersing crowds, particularly with preferential effects on young persons.

SUMMARY OF THE INVENTION

In accordance with the present invention, as seen from a first aspect there is provided a sound-emitting device, said sound-emitting device comprising oscillating means for generating a signal and sounding means for generating a sound wave in accordance with said signal, said sound wave having a frequency that is detectable by one or more subgroups of individuals within a group of individuals, said subgroup of individuals being of the same species as the group of individuals. In particular, the sound-emitting device is arranged such that said one or more subgroups of individuals are caused to move away from said sound-emitting device by said sound wave.

The frequency is chosen to be unpleasant to younger persons. Operating the sound-emitting device at 16.5 kHz±1 kHz is found to create a ringing in the ears of young persons. Older persons typically cannot hear these higher frequencies and so are unaffected by the device.

Said sound-emitting device generates a sound wave typically having a frequency of 16.5 kHz±5 kHz, for example, 11.5 kHz-21.5 kHz.

Said sound-emitting device generates a sound wave having a frequency of 16.5 kHz±2 kHz, and more particularly a frequency of 16.5 kHz±1 kHz.

In accordance with this invention as seen from a second aspect, there is provided a sound-emitting device, said sound-emitting device comprising oscillating means for generating a signal and sounding means for generating a sound wave in accordance with said signal, wherein said signal causes said sounding means to generate a sound wave having a first frequency and a second frequency, said sound wave being detectable by one or more subgroups of individuals within a group of individuals.

Said device further comprises mixing means for combining said first and second frequencies to create a high frequency component and a low frequency beat component.

The sounding means generates a sound wave which switches between said first and second frequency.

It is well known that if two transducers are arranged to emit coherent sound waves of similar frequency, separately, the resulting superposition of the two waves will produce a so-called beat frequency. This beat frequency is simply the difference between the two driving frequencies of the transducers and creates a periodic surge in amplitude of the resulting sound wave.

Said low frequency beat component typically has a frequency in the range of 1-10 Hz.

More typically, said beat frequency is in the range of 1 Hz-6 Hz or said beat frequency is 3.8 Hz±2 Hz.

The oscillating means varies the frequency of said signal between said first frequency and said second frequency.

It is envisaged that said sounding means comprises a transducer.

Said sounding means emits said sound wave with an angular spread in direction in the range of substantially 50°-70°.

Said sound-emitting device can be mounted to a wall or post or similar or is hand-held.

Typically, said sound-emitting device has an operating range of substantially 15 m-20 m.

Said subgroups of individuals are teenagers but a feature of the invention is that the subgroups of individuals within the same species of individuals.

Said sound-emitting device is noticeable to those individuals whom are wearing headphones or using mobile phones.

The device may comprise an amplifier and automatic gain control. The automatic gain control measures the level of background noise and adjusts the amplitude of the sound wave so that the amplitude of the sound wave is above the level of the background noise.

The device is arranged to emit an indicator periodically to indicate that the device is working, such as an audible indicator.

In accordance with this invention as seen from a third aspect, there is provided a method of dispersing a group of individuals, said method of dispersing a signal to cause sounding means to generate a sound wave having a frequency detectable by one or more subgroups of individuals within said group of individuals.

BRIEF DESCRIPTION OF THE DRAWINGS

Exemplary embodiments of the present invention will now be described by way of example only and with reference to the accompanying drawings, in which.

DETAILED DESCRIPTION

Figure 1:
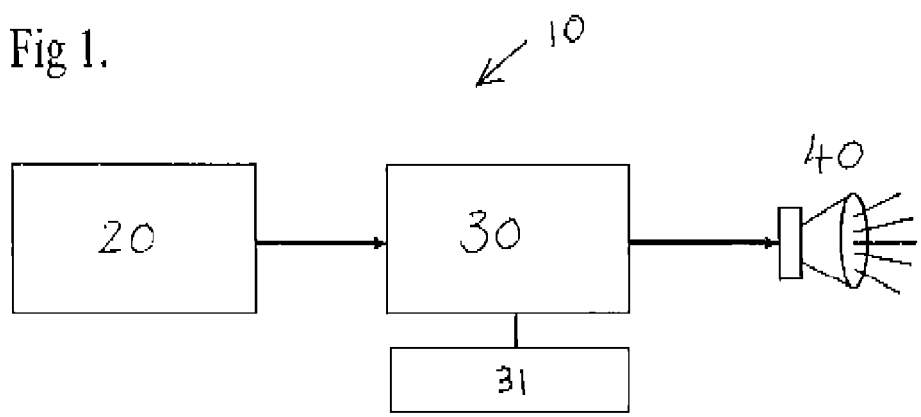
FIG. 1 is a schematic representation of the sound-emitting device in accordance with the first aspect of the invention; and, FIG. 2 is a schematic representation of the sound-emitting device in accordance with the second aspect of the invention.

Referring to FIG. 1, there is shown a sound-emitting device 10. The device 10 comprises an oscillator 20, an amplifier 30 for increasing the signal received from the oscillator 20, and a transducer 40 for generating a sound wave at a frequency in the in the range of 16.5 kHz±1 kHz, in accordance with the signal generated by the oscillator 20 and subsequently amplified by the amplifier 30. The amplifier may further comprise an automatic gain control 31, which measures the level of background noise and adjusts the amplitude of the sound wave accordingly, so that the output level is set to approximately 5-8 dB above the background noise. The device 10 may be mounted to a wall, near places which would be unsuitable for the congregation of young persons, such as outside shops or near street corners, and arranged to emit a sound, for example a "beep", periodically, for example every 60 seconds, at a frequency of approximately 8 kHz, to indicate that the device 10 is working properly.

The device 10 is found to be particularly effective over a range of 15 m-20 m with a directional spread of 50°-70°. Moreover, the system is also found to have an effect on young persons wearing personal headphones or similar, while listening to music etc.

Figure 2:
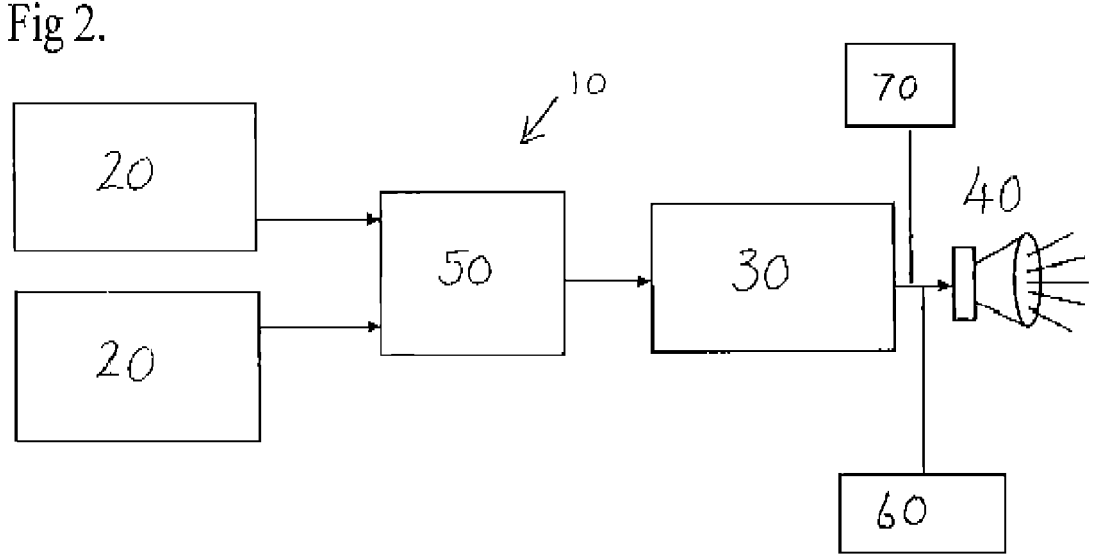

The device 10 shown in FIG. 2 further comprises an additional oscillator 20 and a mixer 50 for combining the signal received from each oscillator 20. In some embodiments it may be preferred that the signals from the two oscillators 20 generate signals which are of slightly different frequency, but each having a frequency within the range of 16.5 kHz±2 kHz, and a low beat frequency component of typically 1-10 Hz but in some applications, preferably 3.8 Hz±2 Hz.

The use of a beat frequency is found to be more beneficial than a single monotone (i.e. single frequency) since in order for the device to work, the frequency must be (preferentially) noticeable to the young persons. However, it is found that unless there is a constant change or refreshing to a person's sense of hearing, the noise will not stay in a person's conscience and will therefore not act to repel the person from the location.

However, the beat frequency creates a slowly varying whining to the unpleasant high frequency component and therefore ensures that the noise is not biologically filtered from the persons conscience.

Alternatively, the signals generated using the oscillators 20 of FIG. 2 can be arranged to generate frequencies of for example, 17.5 kHz and 18.5 kHz separately. By switching the output between these two sources 20 at a rate of approximately 3 Hz, the resultant signal is found create the required unpleasant noise.

When large crowds of young persons gather near shops etc, the activation of the device 10 causes a sound wave to be emitted of a particular frequency, which will be preferentially noticeable to younger persons by virtue of their age. Furthermore, by emitting the sound wave with a power of approximately 85 db, which is less than the power level which causes permanent ear damage, it is found that the sound wave develops a ringing in the ears of the younger persons, and this development is found to occur regardless of whether they are wearing headphones or using a mobile phone. The ringing is preferentially unpleasant to the younger persons and the slowly varying beat of the sound wave ensures that the noise remains a nuisance.

The device 10 can be set to operate for a particular period, for example 20 minutes, once triggering and at the end of the period, the device 10 will reset and can be retriggered. Accordingly, the activation of the device 10 results in the younger persons moving away from that location, while older persons remain oblivious to the sound.

The device 10 further comprises an attenuation switch 60 that when operated will reduce the output of the transducer 40 so that the device 10 can be used indoors and in confined spaces such as stairwells. In addition, the device can comprise a switch 70 that is associated with a monitor that monitors the level of background noise, and can be set to automatically trigger in the event that the background noise exceeds a certain threshold.

Although wall mounted devices have been discussed, the device could be hand held and incorporated in a personal alarm. Alternatively, the device could be incorporated in a security system, such as an alarm system aimed at deterring intruders thereby providing an audible alarm that all can hear as well as an alarm that repels intruders that are sensitive to the sound of the repeller device.

It is envisaged that the sound-emitter may be included in other types of alarm devices other than those installed in public places, for example, the sound-emitter my be included in an alarm clock or even many provided as part of a mobile phone alarm or ring system.

Although the invention is discussed with reference to individual embodiments, it is intended that the invention covers any combination of the embodiments discussed. Further the skilled person will understand that the invention is intended to cover equivalents to those features discussed which are covered by the spirit and scope of the claims.

I claim:

1. A method for dispersing a first group of people in a human population from a fixed location and preventing the first group of people from loitering in the fixed location, comprising:

mounting a sound-emitting device to a permanent structure at the fixed location, said sound-emitting device including oscillating means for generating a signal and sounding means for generating and emitting sound in accordance with said signal;

wherein the sound generated and emitted by said sounding means of said sound-emitting device consists essentially of sound waves in a predetermined frequency band that is no more than 2 kHz in width and encompasses 16.5 kHx, said predetermined frequency band of the sound waves being audible to said first group of people in the human population and substantially inaudible to a second group of people in the human population, whereby said sound emitted by said sounding means of said sound-emitting device operates to disperse said first group of people from said fixed location and to prevent said first group of people from loitering in said fixed location.

2. The method of claim 1, wherein:
said predetermined frequency band is 16.5 kHz±1 kHz.

3. The method of claim 1, wherein:
said sounding means includes a transducer.

4. The method of claim 1, wherein:
said sound is emitted with a directional spread of 50° to 70°.

5. The method of claim 1, wherein:
said permanent structure is selected from the group including a wall and a post.

6. The method of claim 1, wherein:
said fixed location includes an area defined by a distance from said sound-emitting device of up to fifteen meters.

7. The method of claim 1, wherein:
said first group of people are teenagers.

8. The method of claim 1, wherein:
said device comprises an amplifier and automatic gain control.

9. The method of claim 8, wherein:
said automatic gain control measures a level of background noise and adjusts an amplitude of the sound so that the amplitude of the sound wave is above the level of the background noise.

10. The method of claim 1, further comprising:
emitting an indicator periodically to indicate that the device is working.

11. The method of claim 10, wherein:
said indicator is an audible indicator.

12. A method according to claim 1, wherein:
said predetermined frequency band consists of frequencies between 15.5 KHz and 17.5 KHz.

13. A method for dispersing a first group of people in a human population from a location, comprising:
providing a sound-emitting device having oscillating means for generating a signal and sounding means for generating and emitting sound in accordance with said signal;
wherein the sound generated emitted by said sounding means of said sound-emitting device consists essentially of sound waves in a predetermined frequency band that is no more than 2 kHz in width and encompasses 16.5 kHx, said predetermined frequency band of the sound waves being audible to said first group of people, substantially inaudible to a second group of people in the population and operating to disperse said first group of people from said location.

14. The method of claim 13, wherein:
said sounding means comprises a transducer.

15. The method of claim 13, wherein:
said sound is emitted with a directional spread in a range of substantially 50°-70°.

16. The method of claim 13, wherein:
said location includes an area defined by a distance from said sound-emitting device of up to at least fifteen meters.

17. The method of claim 13, wherein:
said first group of people are teenagers.

18. The method of claim 13, wherein:
said device comprises an amplifier and automatic gain control.

19. The method of claim 18, wherein:
said automatic gain control measures the level of background noise and adjusts an amplitude of the sound so that the amplitude of the sound is above the level of the background noise.

20. The method of claim 13, further comprising:
emitting an indicator periodically to indicate that the device is working.

21. The method of claim 20, wherein:
said indicator is an audible indicator.

22. A method according to claim 13, wherein:
said predetermined frequency band is 16.5 kHz±1 kHz.

23. A method according to claim 13, wherein:
said predetermined frequency band consists of frequencies between 15.5 KHz and 17.5 KHz.

24. A sound-emitting device, comprising:
oscillating means for generating a signal; and
sounding means for generating sound in accordance with said signal, said sound consisting essentially of sound waves in a predetermined frequency band that is no more than 2 kHz in width and encompasses 16.5 kHz, said predetermined frequency band of the sound waves being audible to a first group of people in a human population and substantially inaudible to a second group of people in the human population, the second group of people older than the first group of people, wherein said sound operates to disperse said first group of people away from said sound-emitting device.

25. The sound-emitting device of claim 24, wherein:
said predetermined frequency band is 16.5 kHz±1 kHz.

26. The sound-emitting device of claim 24, wherein:
said sounding means emits said sound with a directional spread of sixty ±10°.

27. The sound-emitting device of claim 24, wherein:
said sound-emitting device is hand-held.

28. The sound emitting device of claim 24, wherein:
said first group of people are teenagers.

29. The sound-emitting device of claim 24, wherein:
said predetermined frequency band consists of frequencies between 15.5 kHz and 17.5 kHz.

30. A method for dispersing a first group of people in a human population from a location, comprising:
providing a sound-emitting device at the location, the sound-emitting device having signal generating means for generating an electrical signal and sounding means for generating and emitting sound in accordance with said electrical signal;
wherein said electrical signal has a first frequency component and a second frequency component, said first frequency component within a first predetermined frequency band that is no more than 2 kHz in width and encompasses 16.5 kHz, and said second frequency component in a second predetermined frequency band between 1 Hz and 10 Hz; and
wherein said sound emitted by said sounding means comprises sound waves in said first predetermined frequency band that are modulated at one or more low frequencies within said second predetermined frequency band, wherein said modulated sound waves are audible to the first group of people in the human population and are substantially inaudible to a second group of people in the human population, the second group of people older than the first group of people, whereby the modulated sound waves operate to disperse the first group of people away from the location.

31. A method according to claim 30, wherein:
said first predetermined frequency band consists of frequencies between 15.5 kHz and 17.5 kHz.

32. A method according to claim 30, wherein:
said second predetermined frequency band consists of frequencies between 1.8 Hz and 5.8 Hz.

33. A sound-emitting device, comprising:
signal generating means for generating an electrical signal; and
sounding means for generating and emitting sound in accordance with said electrical signal;
wherein said electrical signal has a first frequency component and a second frequency component, said first frequency component within a first predetermined frequency band that is no more than 2 kHz in width and encompasses 16.5 kHz, and said second frequency component in a second predetermined frequency band between 1 Hz and 10 Hz; and
wherein said sound emitted by said sounding means comprises sound waves in said first predetermined frequency band that are modulated at one or more low frequencies within said second predetermined frequency band, wherein said modulated sound waves are audible to a first group of people in a human population and are substantially inaudible to a second group of people in the human population, the second group of people older than the first group of people, wherein the modulated sound waves operate to disperse said first group of people away from said sound-emitting device.

34. A sound emitting device according to claim 33, wherein:
said first predetermined frequency band consists of frequencies between 15.5 kHz and 17.5 kHz.

35. A sound emitting device according to claim 33, wherein:
said second predetermined frequency band consists of frequencies between 1.8 Hz and 5.8 Hz.

\* \* \* \* \*

UNITED STATES PATENT AND TRADEMARK OFFICE
CERTIFICATE OF CORRECTION

| | |
|---|---|
| PATENT NO. | : 8,031,058 B2 |
| APPLICATION NO. | : 11/465299 |
| DATED | : October 4, 2011 |
| INVENTOR(S) | : Howard Stapleton |

It is certified that error appears in the above-identified patent and that said Letters Patent is hereby corrected as shown below:

In the Claims

Column 4
Claim 1, line 14 should be corrected to read,
kHz, said predetermined frequency band of the sound Signed and Sealed this
Fourteenth Day of May, 2013

Teresa Stanek Rea
*Acting Director of the United States Patent and Trademark Office*